United States Patent [19]

Grohmann

[11] Patent Number: 4,765,846
[45] Date of Patent: Aug. 23, 1988

[54] PROCESS FOR AUTOGENIC FLAME CUTTING WITH OXYGEN

[75] Inventor: Paul Grohmann, Maria-Enzersdorf, Austria

[73] Assignee: Messer. Griesheim GmbH, Fed. Rep. of Germany

[21] Appl. No.: 939,568

[22] Filed: Dec. 9, 1986

[30] Foreign Application Priority Data

Dec. 11, 1985 [DE] Fed. Rep. of Germany ....... 3543657

[51] Int. Cl.⁴ .............................................. B23K 7/00
[52] U.S. Cl. ..................................... 148/9 R; 266/48
[58] Field of Search ................................ 148/9; 266/48

[56] References Cited

U.S. PATENT DOCUMENTS 2,094,641 10/1937 Deming .............................. 148/9 R
2,205,499 6/1940 Smith ................................. 148/9 R Primary Examiner—Wayland Stallard
Attorney, Agent, or Firm—Connolly & Hutz

[57] ABSTRACT

A process for autogenic flame cutting with oxygen includes bringing the oxygen while in the liquid state to a high pressure and feeding the oxygen to the cutting location via a liquid jet cutting nozzle.

13 Claims, 1 Drawing Sheet

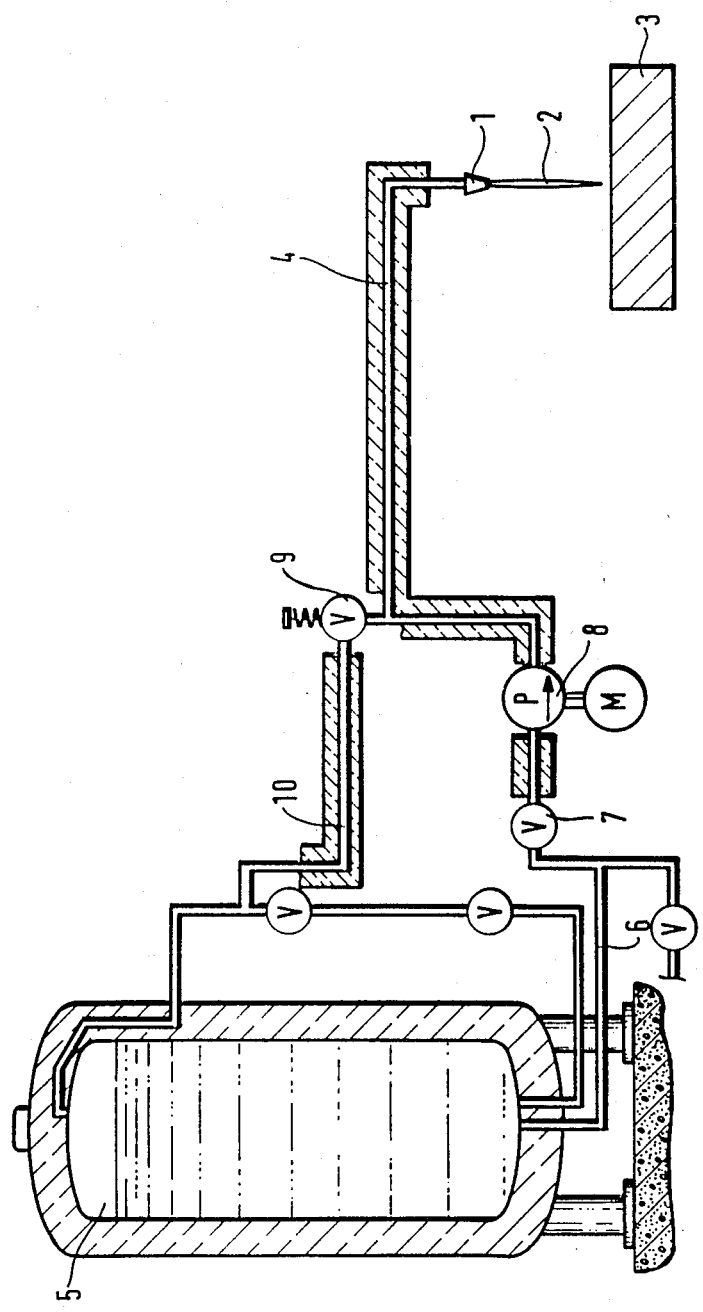

PROCESS FOR AUTOGENIC FLAME CUTTING WITH OXYGEN

BACKGROUND OF INVENTION

It is known that the removal of slag from the cutting grove during flame cutting is a limiting factor where cutting speed is concerned. Higher cutting speeds are an advantage with many applications. Thus the cutting speed during autogenic flame cutting of continuous casting ingots is lower than the pull out speed of the ingots. For example, the cutting speed with ingots 200 mm thick amounts to about 0.5 m/min. The pull out speed, on the other hand, amounts to 1.5/2.0 m/min. If the continuous casting ingots are to be cut longitudinally, it is desirable to adapt the cutting speed to the pull out speed.

SUMMARY OF INVENTION

The objective of the invention is thus to achieve a process for autogenic flame cutting with oxygen according to which the cutting speed can be significantly raised.

The invention proceeds from the idea of linking the high kinetic energy of a liquid jet, which is for example used in water jet cutting, with the technology of autogenic flame cutting. With the use of liquid oxygen, according to the invention, the striking energy can be raised because of the higher densities. Because of the smaller impact area, the striking energy is greater per unit area. The process is purposely carried out so that the amount of liquid oxygen corresponds to the amount of gaseous oxygen needed for the flame cutting. The cold brought in by the liquid oxygen can be tolerated since the heat of vaporization of liquid oxygen is very low. A pre-heater can eventually be installed before the liquid jet nozzle, which permits heating the workpiece so that the surface temperature is raised to the ignition temperature.

THE DRAWING

The simple FIGURE illustrates in schematic form, an embodiment of the invention, namely the cutting of continuous casting ingots.

DETAILED DESCRIPTION

Shown is a liquid jet nozzle 1 from which a jet 2 of liquid oxygen with higher velocity exits and impacts the continuous casting ingot 3 to be cut. The supply of liquid oxygen occurs, via an insulated line 4, and of an insulated storage tank 5 for the liquid oxygen. This insulated tank 5 has the usual, not referenced in closer detail, pipe lines and valves for taking up liquid and gaseous oxygen. The liquid oxygen required for the process according to the invention is drawn from the insulated tank 5, via the line 6 and arrives, via the valve 7, at the high pressure pump 8 which raises the pressure of the liquid oxygen to 500 bar. The pressure from pump 8 may be between 200 and 900 bar. The final pressure of the liquid oxygen available at the liquid jet cutting nozzle 1 is regulated by means of the adjustable overflow valve 9. Unused liquid oxygen flows from the overflow valve 9, through the line 10, back into the insulated storage tank 5. Lines leading to the high pressure pump 8 and to the overflow valve 9 are insulated. The insulated line 4 can additionally be surrounded with liquid nitrogen in order to avoid a premature vaporization of the oxygen. Maximum pressures of 300 to 600 bar can be attained with the liquid oxygen pumps commonly on the market. The invention is not, however, restricted to this pressure range, but rather, pressures of 4000 bar and higher, which are known from water jet cutting can be used.

SUMMARY

The limiting factor of the cutting speed during flame cutting is the removal of slag from the cutting grove. In order to raise the cutting speed, the oxygen, in the liquid state and at a pressure of from several hundred bar to several thousand bar is directed at the workpiece from a liquid jet cutting nozzle. The striking energy and thus the removal of the slag are thus increased. The liquid jet cutting nozzle can be associated with a pre-heater which raises the surface of the workpiece to the ignition temperature. The preferred application area is the cutting of continuous casting ingots.

What is claimed is:

1. In a process for the autogenic flame cutting of metallic workpieces in which the site to be cut has been heated to ignition temperature and in which an oxygen stream is directed to the cutting site with the oxygen stream emerging from a cutting nozzle and with the nozzle and workpiece moving relative to each other to effect the cut, the improvement being in that the oxygen is brought to a high pressure of at least 200 bar while the oxygen is in a liquid state, and the liquid oxygen being fed to the cutting site via a liquid jet cutting nozzle to utilize the high kinetic energy of the liquid jet and to increase the cutting speed thereof.

2. Process according to claim 1, characterized therein that the oxygen is brought to a pressure up to at least 4000 bar.

3. Process according to claim 1, characterized therein that the oxygen is brought to a pressure of between 200 and 900 bar by means of a high pressure pump.

4. Process according to claim 3, characterized therein that a pre-heater burner with which the surface temperature is raised to the ignition temperature.

5. Process according to claim 4, characterized therein that the line leading to the liquid jet cutting nozzle is cooled with liquid nitrogen.

6. Process according to claim 1, characterized therein that a pre-heater burner with which the surface temperature is raised to the ignition temperature.

7. Process according to claim 1, characterized therein that the line leading to the liquid jet cutting nozzle is cooled with liquid nitrogen.

8. Process according to claim 3, characterized therein that the pressure is between 300 and 600 bar.

9. Process according to claim 8, characterized therein that the pressure is 500 bar.

10. Process according to claim 1, characterized therein that continuous casting ingots are being cut.

11. In a device for autogenic flame cutting with oxygen with a supply apparatus for oxygen and with a cutting nozzle connected to the supply apparatus, the improvement being in that said supply apparatus is an insulated storage tank for liquid oxygen, and said cutting nozzle being designed as a liquid jet cutting nozzle which is connected with the storage space for liquid oxygen by means of an insulated line and a high pressure pump capable of bringing the liquid oxygen to a pressure of at least 200 bar.

12. Device according to claim 11, characterized therein that said liquid jet cutting nozzle is associated with a pre-heater.

13. Device according to claim 12, characterized therein that said insulated line is surrounded with liquid nitrogen.

* * * * *